United States Patent Office 2,735,469
Patented Feb. 21, 1956

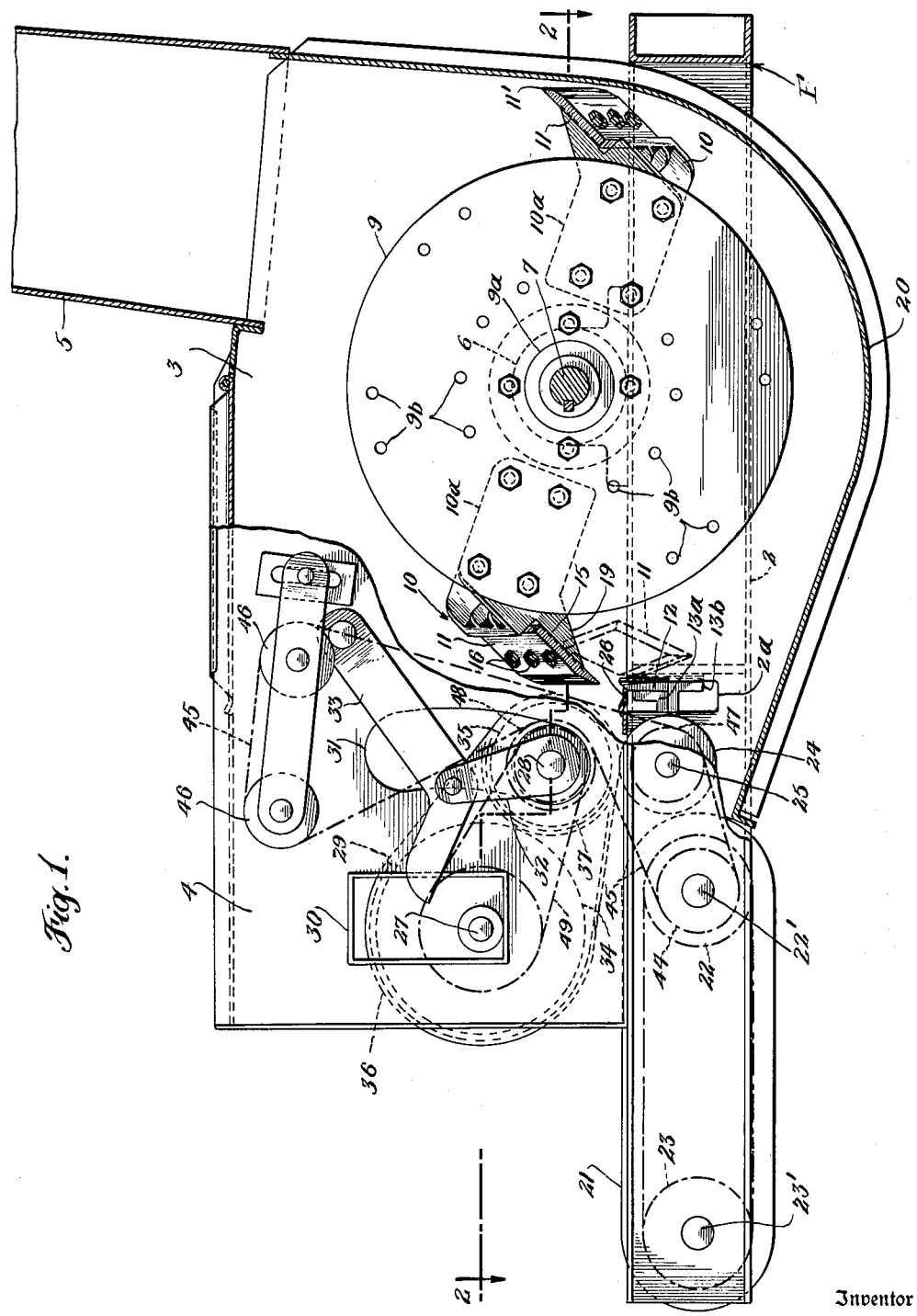

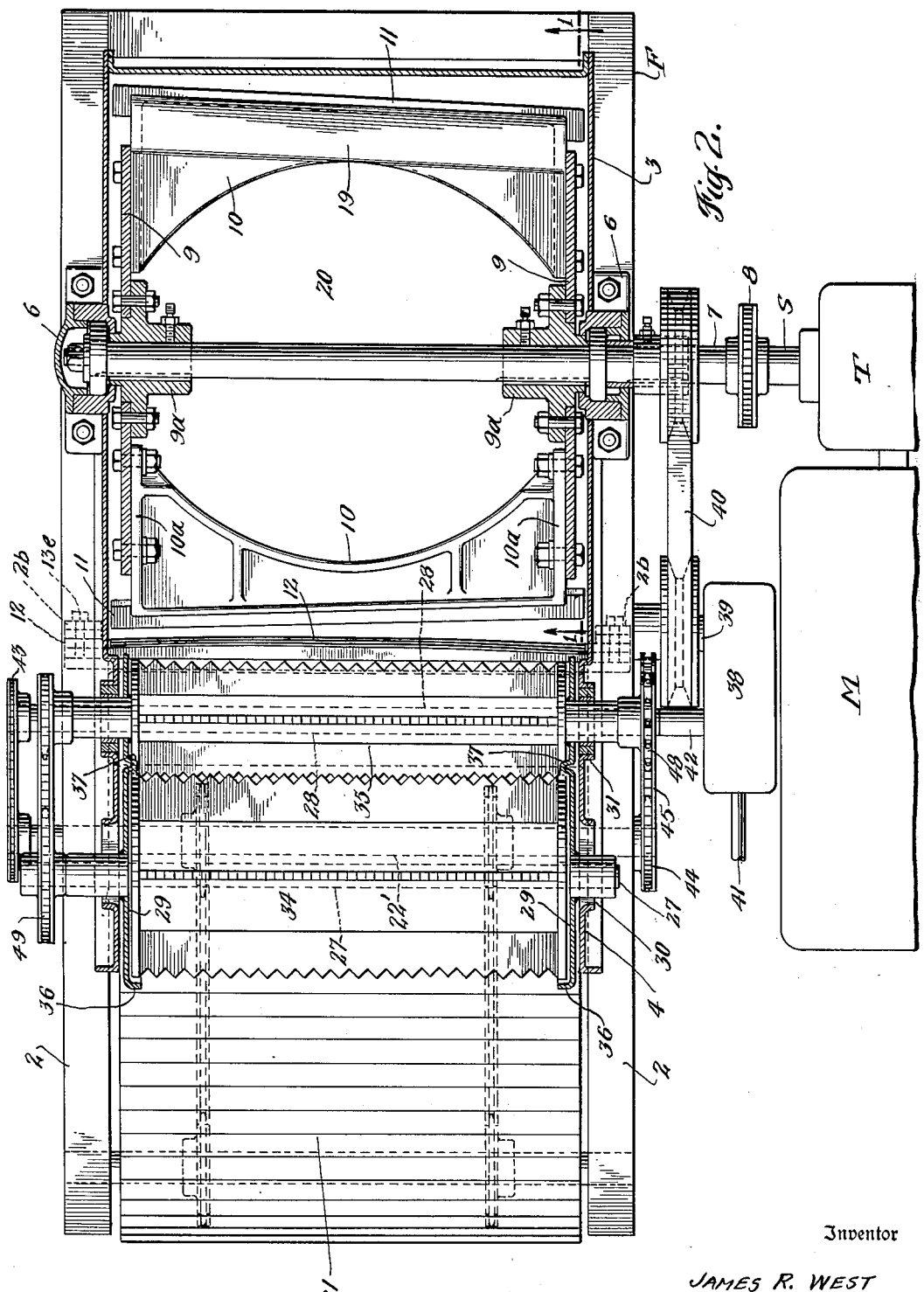

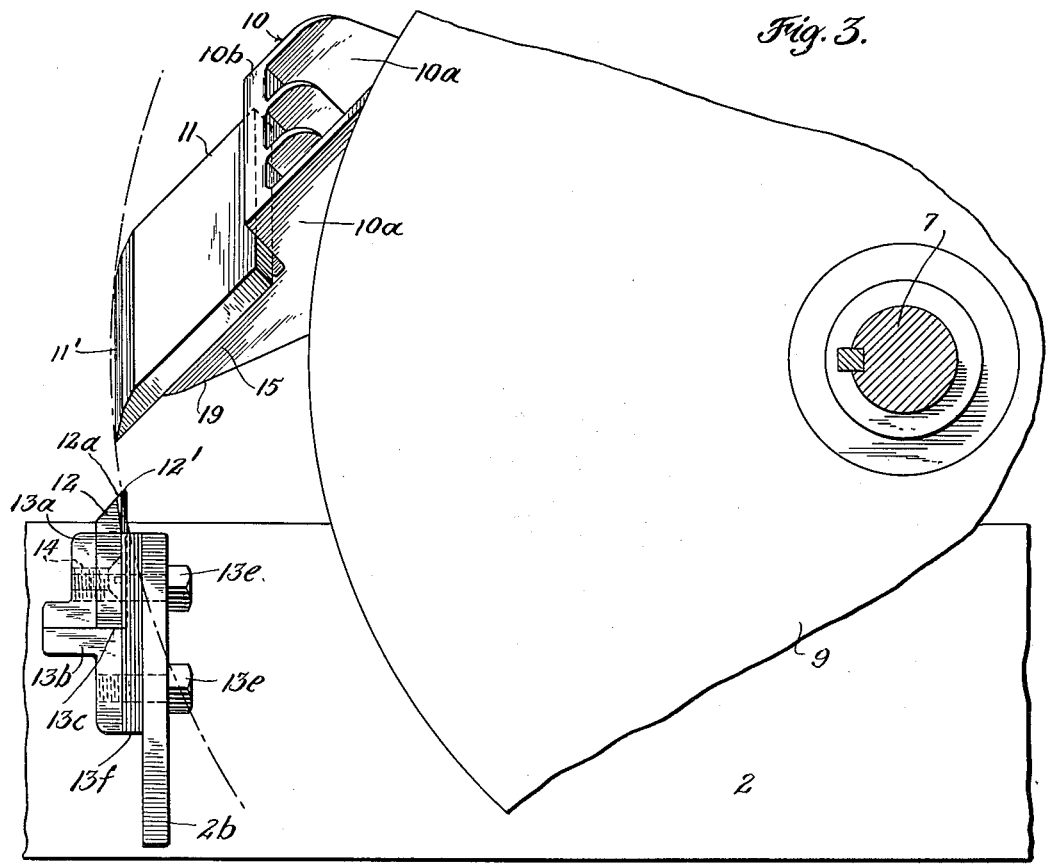
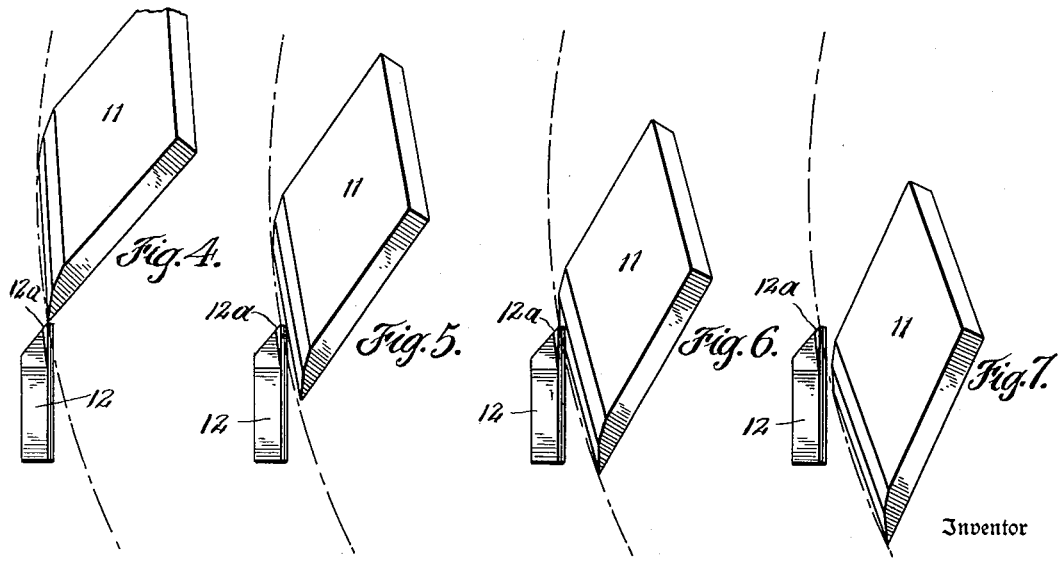
Inventor
JAMES R. WEST
By
Richard E. Babcock Jr.
Attorney

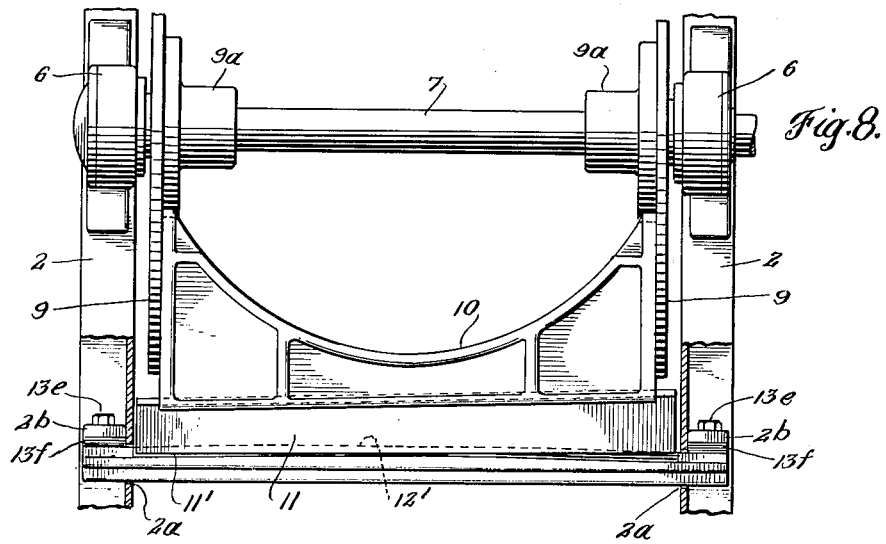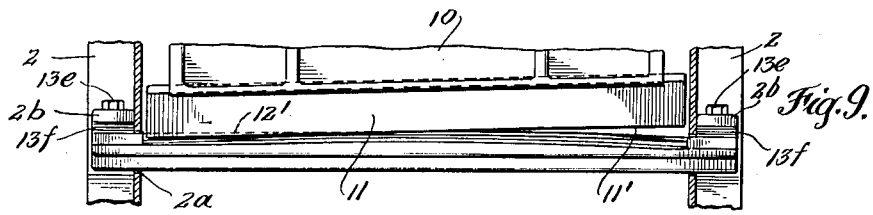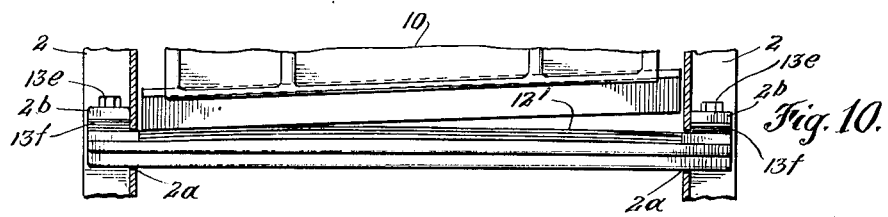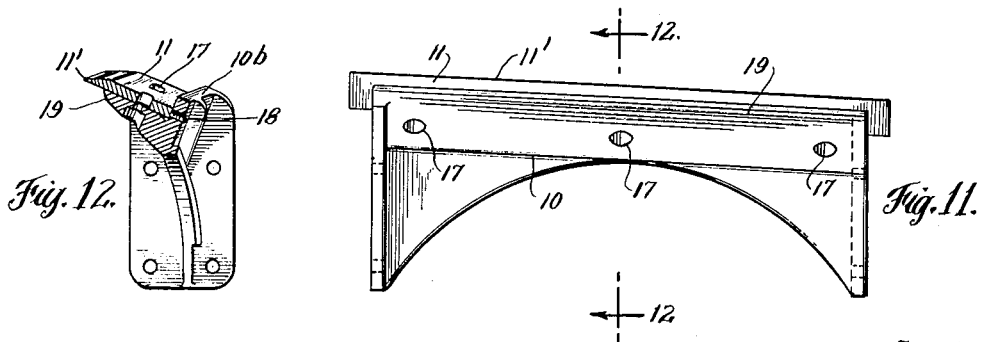

2,735,469

REEL TYPE CHOPPING MECHANISM

James Rex West, New Holland, Pa., assignor, by mesne assignments, to Sperry Rand Corporation, a corporation of Delaware Application February 29, 1952, Serial No. 274,099

4 Claims. (Cl. 146—117)

This invention relates to a reel type cutting or chopping mechanism capable of a wide variety of uses, as for instance in ensilage chopper and blower units, lawn mowers, and in general various types of material comminuting units.

It is usual in cutter reels, as exemplified in conventional lawn mowers and the like, for the several rotating knives to have spiral or helical conformations enabling them to cooperate with the straight edge of a stationary knife to exert a shearing cutting action on the material passing between the stationary knife and the reel. Such a spiral knife is obviously expensive to manufacture and assemble on the reel, and generally requires special machinery to effect its sharpening.

On the other hand, where straight knives have been employed on the cutter reel, these have necessarily extended parallel to the rotational axis of the reel, with the result that the shearing action has been sacrificed. With the foregoing in mind, it is the primary object of the present invention to provide a reel type cutting mechanism in which the reel employs straight knives disposed in angular relation to the rotational axis of the reel to successively cooperate with a stationary knife, the arrangement being such that the point of nearest approach between each reel knife and stationary knife will move progressively from end to end of the respective knives to achieve a scissors like shearing action as the reel rotates, as in the spiral type of knives. Thus the invention retains the advantageous cutting action characteristic of cutter reels having spiral type cutter knives, while greatly reducing the expense and difficulty incident to manufacturing, assembling and sharpening the spiral type knives.

It is a further object to provide adjustable mountings for the respective knives, permitting easier removal of the knives as well as such adjustment as may be necessary to compensate for wear on their cutting edges, whereby they may be removed and sharpened and thereafter replaced and adjusted most efficiently for cooperation with the said stationary knife. Also, it is desirable to provide for adjustment of the stationary knife in minor increments to take up the wear occurring on the respective knives between sharpenings of the reel knives.

A further object is to provide, in conjunction with each of the reel knives a novel arrangement of fan blade adapting the said reel for use in a chopper blower unit and the like, the said fan blades also functioning to prevent the cut material from lodging on and being carried around with the knives. In this connection the invention contemplates the provision of a chopper blower reel in which the several chopper knives are supported on the fan elements in such a relation that the fan elements will direct currents of air past the cutting edge and immediately adjacent inner faces of the respective knives.

A still further object is to provide such a reel type cutting mechanism employing straight knives, in which a normally straight edged stationary knife may be supported on a backing element and resiliently deformed to a shape adapting it for efficient cooperation with the straight knives of the reel.

An additional object is to provide a feed unit for delivering material to such a cutting mechanism, the feed unit incorporating a novel means for preventing entanglement of the conveyed material around its several rotating conveyer rolls.

In the accompanying drawings:

Figure 1 is a side elevational view partly in section on the line 1—1 of Figure 2 and with certain sprocket wheels and chains indicated diagrammatically in dot and dash lines;

Figure 2 is a plan section taken substantially on the line 2—2 of Figure 1 but with the reel rotated to the position indicated by the dot and dash position of the left hand blade in Figure 1;

Figure 3 is an enlarged fragmentary view showing the relation of a reel knife blade to the stationary knife just prior to the cutting action and corresponding to the full line position of Figure 1. This view is somewhat diagramatic in that certain bolts etc. are omitted and in showing the web plate which supports the stationary knife assembly without showing the near side frame member by which the web plate is carried;

Figure 4 is a view similar to Figure 3 of the stationary knife and one of the cooperating reel knives only, the reel being rotated to bring the near end of the reel blade in cutting contact with the stationary knife at its near end;

Figure 5 is a view similar to Figure 4 showing the reel rotated to bring the middle portion of the reel knife in cutting contact with the bowed middle portion of the stationary knife;

Figure 6 is a view similar to Figure 4 showing the reel rotated to bring the far end of the reel knife in cutting contact with the stationary knife at its far end;

Figure 7 is a view similar to Figure 4 showing the position of the reel knife after it has been rotated to a point past the stationary knife in a position corresponding to the dot and dash position of Figure 1;

Figures 8, 9, and 10 are fragmentary plan views showing the reel in the positions of Figures 4, 5 and 6 respectively;

Figure 11 is a face view of a reel knife and its support looking toward the right in Figure 12; and, Figure 12 is a cross-section on the line 12—12 of Figure 11.

In the present application I show and describe my invention as incorporated in the chopper and blower unit of a field forage harvester such as is customarily moved over a field, to harvest the crop, chop or comminute same and thereafter elevate it for delivery into a suitable accompanying vehicle. However, my invention is by no means restricted to this use, but is capable of use for any purpose requiring or permitting utilization of a reel type cutting mechanism.

Referring now in detail to the accompanying dawings, the illustrated mechanism comprises an ambulatory wheeled supporting frame F. Supported between the channeled side rails 2 of the frame is a chopper and blower housing 3, having a forwardly disposed feed passage 4 and a conventional blower discharge pipe 5 communicating with the interior of the casing. A hinged cover 3a on the top of the housing 3 permits ready access to its interior. Material is delivered into the housing 3 through feed passage 4 to be chopped or comminuted and then discharged through the pipe 5, by the action of blower means which may be incorporated in the construction of the chopper unit.

The feed mechanism for delivering the material through the feed passage 4 may be of any usual type, though the specific mechanism shown incorporates certain improvements, hereinafter, described.

Journalled for rotation in bearings 6—6 mounted on the respective opposite frame members 2 is a shaft 7, the medial portion of which is rotatably disposed across the housing 3. The shaft 7 may be coupled, as at 8, to the drive shaft S extending from the transmission T of a motor M.

Rotatable with the shaft 7 within the housing 3 is a cutter reel embodying a pair of relatively spaced discs 9—9 having hubs 9a respectively keyed on the shaft 7, and one or more knife supports 10 extending between and having parallel end plates 10a bolted or otherwise connected to the respective disc 9. Preferably a plurality of such supports 10 are employed, these being arranged symmetrically and in balanced relation about the reel axis as defined by the shaft 7.

While only two such supports 10 and knives 11 are shown in the instant case, this is merely for the sake of simplicity. It will be readily apparent that more knives may be mounted on the reel and, to facilitate this the reel end discs 9 are preferably provided with extra bolt holes 9b disposed to receive the supporting bolts of additional knife supports 10. Fixedly carried by each knife support 10 is a flat knife 11 disposed in a generally tangential plane and having a straight or rectilinear cutting edge 11' presented in the direction of rotation of the reel.

At one end of the reel the ends of the knives 11 are uniformally tangentially displaced forwardly relatively to their respective opposite ends, so that the knives 11 all extend at an angle to the rotational axis 7 of the reel and to the cutting edge of a stationary knife 12 supported across the bottom of the infeed passage 4 of the housing 3 in a common plane with the reel axis 7. This enables the reel knives to successively cooperate with the stationary knife 12 to exert a shearing or scissors like cutting action on material entering the feed passage and passing between the stationary knife 12 and the cutting reel.

Despite the relative tangential advancement or displacement of the leading ends of the knives 11, these knives are so supported that the cutting edges of the respective knives at both end portions are equidistant from the reel axis 7. To this end, the body portion of each knife at its leading end rearwardly of the edge is supported at a lesser distance from the reel axis 7 than is its body portion at its opposite end.

Thus, although the body portion of each knife 11 is brought closer to the reel axis at one end than at the other, this is merely to compensate for the relative forward or tangential advancement at the one end of the knife, to maintain the generally tangentially directed cutting edge 11' itself equally spaced from the reel axis at both ends, but extending at an angle to the reel axis in a manner roughly approximating a segment of a spiral.

Notwithstanding the equidistant relation of the ends of the knife edges 11' to the reel axis 7, it will be seen that the mid-sections of the respective knife edges will lie somewhat closer to the reel axis than do the ends. For, if the cutter reel be visualized as encompassed by a cylinder coaxial therewith, and of a diameter equal to that of the paths described by the ends of the knife edges in rotation, it will be apparent that the linear cutting edge 11' of each knife, due to its angularity with the reel axis, will extend along a chord of the cylindrical surface when viewed in end elevation, as best illustrated in Figures 3 to 7 inclusive. In each of these views it will be seen that the medial portion of the blade edge 11' is spaced radially inwardly somewhat from the rotational path, indicated in broken lines, pursued by its opposite ends during rotation.

Due to this it has been found that the rotating cutting edges 11' of the reel knives 11 generate a hyperboloid surface, and in order for the stationary knife 12 to be disposed in most efficient cooperative shearing relation with reel knives 11, it is essential that the cutting edge 12' of the stationary knife 12 closely approximate a hyperbolic curve contiguous to the surface of the generated hyperboloid surface and in a plane parallel to the reel axis. For the purpose of illustration, the degree of curvature of the knife 12 has been somewhat exaggerated in Figures 1 and 2.

As a practical matter it has been found that, where the angular relation between the reel knife edges 11' and the reel axis 7 is not excessive, only a very slight almost imperceptible curvature or inward bowing of the stationary knife edge 12' toward the reel axis 7 is required, and a properly chosen curve of constant radius will approximate the desired hyperbolic curve with sufficient exactness as to permit efficient cooperation of the respective knives 11 and 12.

Because of this it is practical and desirable for the stationary knife 12 to be a slightly flexible straight flat knife having a normally perfectly rectilinear cutting edge 12'. This knife may be curved to the desired shape about the correspondingly curved portion 13a of a backing member or support 13, and removably secured thereon as by the screws 14. As best shown in Figures 1 and 3, the backing member or support 13 may be formed of a pair of angle irons welded or otherwise fixedly connected into a unitary structure, the upper angle iron being curved as aforementioned to provide the curved portion 13a. The lower angle 13b preferably has a horizontal face projecting rearwardly beyond the curved portion 13a to provide a ledge 13c abutting against the lower edge of the knife 12 to vertically stiffen and support same against the downward impacts of the rotating reel knives 11.

The backing member 13 is suitably secured in housing 3 across the bottom of feed passage 4, preferably in a manner permitting both easy removal of the knife 12 and backing member 13 as a unit and adjustment of the backing member 13 and knife 12 in a direction radially of the reel axis 7.

Thus, the opposite ends of the knife 12 and backing member 13 project through apertures 2a in the channel side frame members 2 and are secured by bolts 13b (Figure 3) against vertical webs 2b secured in the outwardly disposed channels of the members 2. Shims 13f interposed between the webs 2b and the ends of the knife assembly 12, 13 may be successively removed as desired to permit easy adjustment of the knife 12 toward the reel axis in such small steps as may be desired to take up wear on the knives 11 and 12 between sharpenings of the knives 11. Thus a relatively close clearance and efficient shearing relation may be maintained between the knives 11 and 12 at all times.

Where it is desired to remove the knife 12 for sharpening or replacing, removal of the bolts 13e and shims 13f will permit endwise withdrawal of the entire stationary knife assembly 12, 13 through one of the apertures 2a in the side frame members 2. Thereafter, removal of the screws 14 will permit dismantling of the knife 12 from the knife assembly for sharpening.

The reel knives 11 are preferably removable from their respective supports 10 for sharpening, and also, preferably are adjustable to take up the wearing away of their cutting edges 11' as caused by sharpening.

To this end and as shown in Figures 11 and 12, the supports 10 are formed with substantially tangential flanges 15 having flat outer faces or seats against which the respective knives 11 are clamped by means of bolts 16, which pass through transverse slots 17 in the respective knives. Tangential adjustment of each knife 11 on its bolts 16 throughout the range permitted by the slots 17 is facilitated by screws 18 threaded through the rear marginal flange 10b of each support 10 into engagement with the back of the knife. Adjustment of these screws 18 may take up any wear on the knife edges as well as compensate for uneven wear.

Removal of the bolt 16 will of course permit easier removal of the respective knives 11 for sharpening or replacement. Obviously the knives 11, due to their flat straight edged configuration, may be sharpened by hand or by conventional grind stone, and do not require any special sharpening machinery such as is required to generate and retain the spiral edges on helical or spiral blades.

The outer faces or seats of the respective flanges 15 will be somewhat inclined in an axial direction, with the end closest to the reel axis being advanced tangentially relative to the other end, all to the degree required to support the respective knives 11 in the manner above mentioned.

Where as in the present embodiment, the cutting reel is employed also as a blower unit, it is desirable to provide fan elements or surfaces 19 inclined radially inwardly from locations adjacent the cutting edges 11' of the respective reel knives 11. As shown in Figures 11 and 12, such fan elements or surfaces 19 may advantageously be integrally incorporated in the structure of the several supports or castings 10 which carry the respective blades 11 and in the preferred embodiment these elements 19 comprise the inner surfaces of the respective flanges 15. Otherwise stated, the knife supports 10 are provided with fan blades 19 having substantially radially disposed inner fan surfaces and substantially tangentially disposed outer faces which support the knives 11 thereon.

The location of the fan elements 19 with their outer extremities just rearwardly of and adjacent the knife edges 11' results in concentrating the outerwardly flowing air currents directly across the knife edges 11' thereby tending to clear the knives 11 of any material which might otherwise tend to cling thereon and retard the movement of the reel.

The floor 20 in the housing 3 between the feed opening 4 and the discharge pipe 5 is curved coaxially to the cutting reel so that material cut by the knives 11 will be moved around the floor 20 by the knives 11 and fan blades 19 and impelled tangentially into the discharge pipe 5 by the respective knives and fan blades. The blades 19 will also cause upward flow of air through the discharge pipe 5 to convey the discharged material therethrough in accordance with usual practice.

It will be noted that the cutting edges 11' of the respective reel knives are ground or beveled only on the outer faces of these knives, so that these beveled portions rotate on a path contiguous to the cutting edge of the stationary knife 12, which in turn is ground or beveled only on the side remote from the cutting reel. Thus it is possible to bring the highly sharpened cutting edges of the rotating and stationary knives 11 and 12 respectively into accurate and highly efficient shearing relation, necessitating but a minimum amount of operating power in proportion to the amount and condition of the material operated upon. As thus arranged, the reel knives 11 and stationary knife 12 will each exert a cutting action on the material independently of the shearing action.

By champfering or releaving the inner face of the stationary knife 12 adjacent the end thereof first engaged by the respective reel knives 11, there may be formed an inclined cam surface 12a, best shown in Figure 3. This cam surface 12a being the first portion of the stationary knife 12 engaged by the respective reel knives 11, will guide such reel knives into proper shearing relation with the knife 12 and avoid any tendency of the reel knives 11 to project across and impact against the edge of knife 12 with consequent damaging results.

Except as to certain details, the feed mechanism for the chopper is substantially similar to that disclosed in the Miles L. Sensenig U. S. Patent 2,402,849, embodying a conveyor apron 21 supported on rolls 22, 23, the shafts of which are rotatably journalled between the side rails 2 of the frame, as shown in Figure 2.

A feed roll 24 rearwardly of the apron 21 has its shaft 25 rotatably journalled between the side rails 2—2, the roll 24 being arranged closely adjacent the end of the feed apron 21 to receive material therefrom, and a plate 26 bridges the space between the roll 24 and the stationary knife 12 at a level to support material for movement from the roll 24 across the upwardly presented cutting edge of the knife 12.

It will be noted in Figure 1 that the floor 20 of the housing extends beneath the roll 24 into near engagement with the feed apron 21 to catch any material which may drop between the apron and roll. Thus material which might otherwise be lost is delivered into the chopper housing from where it may be discharged through the pipe 5 together with the comminuted material.

Mounted in spaced relation above the belt or apron 21 is a presser unit including the driven roll shafts 27 and 28 journalled between side plates 29—29 which rigidly connect said shafts for floating movement as a unit. The bearings for the respective shafts 27, 28 project from the side plate 29 and are disposed for vertical movement in slots 30—31 respectively in the opposite side walls of the chopper feed passage 4. Through a link 32 and lever 33 on each side of the housing 3, the rear roll shaft 28 is raised in response to lifting the front roll shaft 27 beyond its point of initial engagement with the lever 33, all in the same manner and for the same purpose as described in the aforesaid Sensenig Patent 2,402,849.

However, the presser unit itself is improved and simplified over that of the patent in that the apron or belt used in the presser unit of the patent is eliminated and in place thereof I employ toothed rolls 34 and 35 keyed c their respective shafts 27 and 28. The side plates 29 cover the ends of the rolls 34 and 35 and are provided with inwardly directed arcuate guards or shrouds 36, 37 extending over the adjacent forwardly presented faces of the rolls 34, 35 to prevent incoming material from entering between the roll ends and side plates 29 to wrap around the shafts 27, 28. Guards 36 may comprise inturned arcuate edges or flanges of the plates 29 and guards 37 may comprise inwardly pressed arcuate beadings stamped into the respective plates 29.

In order to drive the feed mechanism a transmission 38 mounted on one side of the chopper housing 3 is driven through a stub shaft 39 by a belt drive 40 from the chopper reel shaft 7. A shaft 41 leads from the transmission 38 forwardly for driving a sickle bar or other auxiliary device.

A cross shaft 42 connected to the transmission 38 has a chain driving connection 43 at the opposite side of the machine with the rear apron shaft 22'. Keyed on the apron shaft 22' at the near side of the machine is a sprocket 44 which drives a chain 45. The chain 45 is supported over idler sprockets 46—46 with one run in driving engagement with a sprocket 47 on the smooth roll shaft 25 and its other run in driving engagement with a sprocket 48 on the rear presser roll shaft 28, the arrangement being such that the sprocket 48 is free to move up and down without interrupting its driven connection with the chain 45. A chain drive 49 from the opposite or far end of the rear roll shaft 28 to the forward roll shaft 27 causes rotation of the latter.

Thus in operation, as the machine is drawn through a field, hay or other crop material is delivered onto the conveyor apron 21 in any suitable manner, as by conventional pick-up mechanism. The feed mechanism then progresses the material through feed passage 4 to be acted upon by the cooperating feed knives 11 and stationary knife 12. The knives 11 and 12 function to comminute the material and the chopped or comminuted material is then moved rearwardly around the curved housing 20 and discharged through the pipe 5. The action of the cutting knives 11 and 12 is graphically illustrated, in successive operational steps, in Figures 4 to 10 inclusive. As each knife 11 is rotated to the position shown in Figures 4 and 8, in which the leading or near end of the reel knife 11 is brought into contact with the stationary knife 12, the champfered or cammed portion 12a of knife 12 will coact with knife 11 in obvious manner to insure that the latter does not project across or impact against the cutting edge 12'.

Thereafter as the reel rotates, the point of contact between the blades 11 and 12 will progress in an axial direction toward the center of the blades 11 and 12. As this point of contact moves toward the center of the blade edges 11', 12' to the position of Figures 5 and 9, the knife edge 11' progressively approaches closer to the reel axis 7. However, the inward bowing of the stationary blade edge 12' compensates for this and causes the blades or knives to maintain contact even at their midpoints.

Thereafter, as the point of contact moves from the midpoint to the far or trailing end of the blade or knife 11, the bowing of the knife 12 compensates for gradually increasing radial distance of the knife edge 11' from its axis 7 to maintain a continuous contact between these knives until their far ends are in contact in the position shown in Figures 6 and 10, following which the knives 11 and 12 disengage as in Figure 7, preparatory to the next succeeding engagement between the knife 12 and immediately following reel knife 11.

Thereafter, as each reel knife 11 rotates from a stationary knife 12 it carries with it the material sheared off as it passes knife 12, moving such material around the housing floor 20 and discharging it upwardly through the pipe 5, the material being impelled through the pipe 5 both by centrifugal force and by the air current produced by the fan portions 19 of the reel. The air currents produced by the respective fans 19 are directed outwardly across the edges of the knives 11 and thus tend to clear these knives of material which might otherwise lodge about their edges 11' or on the inner faces of these knives adjacent their edges 11'.

What is claimed is:

1. A chopper and blower unit comprising a housing having a feed opening and a discharge opening, a chopper and blower reel rotatable in said housing, said reel comprising substantially tangentially directed knives and fan blades extending radially inwardly from locations contiguous to the inner surfaces of the respective knives between said surfaces and the rotational axis of the reel to create air currents for conveying the chopped material and for clearing the material from the cutting edges of said knives.

2. In a rotary chopper blower reel construction the combination of a knife support extending in a direction substantially axially with regard to the rotation of the reel, a flat knife supported on the outer face of said support with its cutting edge directed substantially tangentially with regard to the rotation of said reel, the inner face of said knife support being radially inwardly inclined from a location contiguous to the inner surface of said knife and adjacent the edge of said knife, to function as a fan directing air currents across said knife edge and reducing the tendency of material to lodge on said knife.

3. In a rotary chopper blower reel construction, a knife support having a radially outwardly disposed knife seat extending substantially tangentially with regard to the rotation of the reel, a flat knife fixed against said seat with its cutting edge projecting tangentially beyond the leading edge of said seat, said support being formed with an inner face inclined radially inwardly from the leading edge of said seat and from a location contiguous to the inner face of said knife to function as a fan directing air currents across said cutting edge of the knife.

4. A rotary chopper and blower reel comprising flat cutting knives supported on said reel with their cutting edges presented generally tangentially in the direction of rotation of the reel, and fan blades positioned between the respective knives and the rotational axis of the reel, said blades having radially inclined fan surfaces extending inwardly from locations adjacent the cutting edges of the respective knives and contiguous to the inner faces of the respective knives to direct air and the chopped material outwardly across said edges.

References Cited in the file of this patent

UNITED STATES PATENTS

| | | |
|---|---|---|
| 96,679 | Dietrich | Nov. 9, 1869 |
| 993,173 | Karhu | May 23, 1911 |
| 1,172,114 | Debaker | Feb. 15, 1916 |
| 1,190,499 | Woods | July 11, 1916 |
| 2,126,072 | Westerlund | Aug. 9, 1938 |
| 2,359,995 | Harum | Oct. 10, 1944 |
| 2,399,529 | Willits | Apr. 30, 1946 |
| 2,594,583 | Richardson | Apr. 29, 1952 |
| 2,656,868 | Hintz et al. | Oct. 27, 1953 |